United States Patent
Güterbock et al.

(10) Patent No.: US 12,311,763 B2
(45) Date of Patent: May 27, 2025

(54) IMMERSIVE VEHICLE COMPONENT CONFIGURATION AND OPERATION

(71) Applicant: Volkswagen Aktiengesellschaft, Wolfsburg (DE)

(72) Inventors: Gerrit Güterbock, Wolfsburg (DE); Christian Kern, Braunschweig (DE); Vince Tulit, San Mateo, CA (US); Enes Olcay, Redwood City, CA (US)

(73) Assignee: Volkswagen Aktiengesellschaft, Wolfsburg (DE)

( * ) Notice: Subject to any disclaimer, the term of this patent is extended or adjusted under 35 U.S.C. 154(b) by 253 days.

(21) Appl. No.: 17/976,435

(22) Filed: Oct. 28, 2022

(65) Prior Publication Data
US 2024/0140196 A1   May 2, 2024

(51) Int. Cl.
*B60K 35/00* (2024.01)
*B60K 35/26* (2024.01)

(52) U.S. Cl.
CPC .............. *B60K 35/00* (2013.01); *B60K 35/26* (2024.01); *B60K 2360/33* (2024.01); *B60K 2360/40* (2024.01)

(58) Field of Classification Search
CPC .... B60K 35/00; B60K 35/26; B60K 2360/33; B60K 260/40; B60K 35/22
See application file for complete search history.

(56) References Cited

U.S. PATENT DOCUMENTS

| | | | |
|---|---|---|---|
| 8,527,146 B1 * | 9/2013 | Jackson | B60W 50/0098 180/287 |
| 2011/0153140 A1 * | 6/2011 | Datta | B60R 16/037 701/1 |
| 2014/0046505 A1 * | 2/2014 | Sakoda | B60K 35/29 701/2 |
| 2020/0307350 A1 * | 10/2020 | Akiyama | B60H 1/00857 |
| 2024/0109413 A1 * | 4/2024 | Poornachandran | B60K 35/00 |

FOREIGN PATENT DOCUMENTS

WO   WO-2016079476 A1 *   5/2016   ............. B60K 35/00

* cited by examiner

*Primary Examiner* — Mary Cheung
(74) *Attorney, Agent, or Firm* — Peter Zura; LOZA & LOZA, LLP (57) ABSTRACT

A vehicle system, including one or more vehicle immersion components, operatively coupled to a vehicle processing apparatus, each of the one or more vehicle immersion components configured to execute an immersive effect in the vehicle. A vehicle component, operatively coupled to the vehicle processing apparatus, is configured to execute a vehicle function, wherein an operational profile includes data for assigning the vehicle component to the one or more vehicle immersion components, and where the vehicle component is configured to modify operation from executing the vehicle function to executing the immersive effect when the operational profile is executed in the vehicle.

20 Claims, 8 Drawing Sheets

| Profile 1 600A | Pedal | Steer. Wheel / Joystick | Screen | Dial | Button |
|---|---|---|---|---|---|
| Air vents (volume) | X | | | | |
| Air vents (direction) | | X | | | |
| Ambient light | | | X | | |
| Force feedback steering wheel | | X | | | |
| Seat vibration | | | | X | |
| ID light | | | | | |
| Seat vents | X | | | | |

Column labels: 616, 618, 620, 622, 624
Row labels: 602, 604, 606, 608, 610, 612, 614

IMMERSIVE VEHICLE COMPONENT CONFIGURATION AND OPERATION

TECHNICAL FIELD

The present disclosure relates to immersive vehicle component operation. More specifically, the present disclosure relates to modifying operating modes of a vehicle to activate and/or deactivate vehicle components to provide a physically immersive effect in the interior environment of a vehicle.

BACKGROUND

Vehicles have developed over the years to include various devices, features and services that increase and/or improve user experience. To this end, vehicles have been equipped with hardware and software to allow vehicle users to engage in non-driving related tasks (NDRT) such as media consumption (e.g., games, music movies, etc.) that is independent of the driving functionalities of the vehicle itself (i.e., driving-related tasks (DRT)). While various aspects of NDRT technologies have improved over the years, there exists a need to provide immersive functionalities for NDRT in a vehicle utilizing existing vehicle components.

SUMMARY

Various apparatus, systems and methods are disclosed herein relating to controlling operation of a vehicle. In some illustrative embodiments, A vehicle system, is disclosed, comprising: a vehicle processing apparatus; a memory, operatively coupled to the vehicle processing apparatus; one or more vehicle immersion components, operatively coupled to the vehicle processing apparatus, each of the one or more vehicle immersion components configured to execute an immersive effect in the vehicle; and a vehicle component, operatively coupled to the vehicle processing apparatus, wherein the vehicle component is configured to execute a vehicle function, wherein the memory is configured to store an operational profile comprising data for assigning the vehicle component to the one or more vehicle immersion components, and wherein the vehicle component is configured to modify operation from executing the vehicle function to executing the immersive effect when the operational profile is executed.

In some examples, a method is disclosed for operating a vehicle immersion system, comprising: configuring, via a vehicle processing apparatus, each of one or more vehicle immersion components to execute a respective immersive effect in the vehicle; storing, in a memory, an operational profile comprising data for reassigning a vehicle component, configured to execute a vehicle function, to operate the one or more vehicle immersion components; and modifying operation of the vehicle component from executing the vehicle function to executing the immersive effect, when the operational profile is executed in the vehicle.

In some examples, a method for operating an immersion system for a vehicle, comprising: configuring, via a vehicle processing apparatus, each of one or more vehicle immersion components to execute a respective immersive effect in the vehicle; generating an operational profile for the vehicle, wherein the operational profile comprises user-selected data assigning a vehicle component, configured to execute a vehicle function, to operate the one or more vehicle immersion components; and modifying operation of the vehicle component from executing the vehicle function to executing the immersive effect, when the operational profile is executed in the vehicle.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE FIGURES

The present invention is illustrated by way of example and not limitation in the figures of the accompanying drawings, in which like references indicate similar elements and in which.

DETAILED DESCRIPTION

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. However, because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that the term "module" as used herein does not limit the functionality to particular physical modules, but may include any number of tangibly-embodied software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via Scalable Language ("Scala"), C, C++, C #, Java, Actionscript, Objective-C, Javascript, CSS, XML, etc.).

Figure 1:
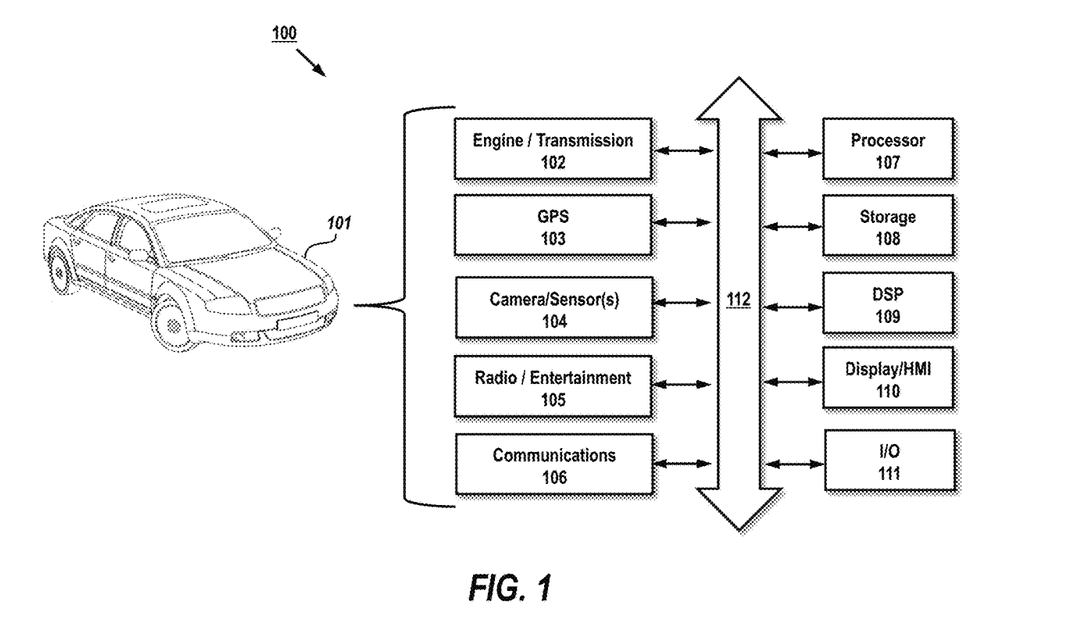
FIG. 1 shows an exemplary vehicle system block diagram showing multiple components and circuits for providing immersive functionalities according to some aspects of the present disclosure.

Turning to FIG. 1, the drawing illustrates an exemplary system 100 for a vehicle 101 comprising various vehicle electronics circuitries, subsystems and/or components. Engine/transmission circuitry 102 is configured to process and provide vehicle engine and transmission characteristic or parameter data, and may comprise an engine control unit (ECU), and a transmission control. For a diesel engine, circuitry 102 may provide data relating to fuel injection rate, emission control, NOx control, regeneration of oxidation catalytic converter, turbocharger control, cooling system control, and throttle control, among others. For a gasoline and/or hybrid engine, circuitry 102 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals for any of gasoline, hybrid and/or electrical engines.

Global positioning system (GPS) circuitry 103 provides navigation processing and location data for the vehicle 101. The camera/sensors 104 provide image or video data (with our without sound), and sensor data which may comprise data relating to vehicle characteristic and/or parameter data (e.g., from 102), and may also provide environmental data pertaining to the vehicle, its interior and/or surroundings, such as temperature, humidity and the like, and may further include LiDAR, radar, image processing, and computer vision. Camera/sensors 104 also include internal sensors that track or record driver and/or passenger characteristics, including visual and/or audio characteristics. For example, an internal cabin camera may record facial expressions of a driver and/or one or more passengers and processed via DSP 109. A microphone may similarly record ambient audio in the vehicle cabin, as well as capture voice commands that may be processed via DSP 109.

Radio/entertainment circuitry 105 may provide data relating to audio/video media being played in vehicle 101. The radio/entertainment circuitry 105 may be integrated and/or communicatively coupled to an entertainment unit configured to play AM/FM radio, satellite radio, compact disks, DVDs, digital media, streaming media and the like. Communications circuitry 106 allows any of the circuitries of system 100 to communicate with each other and/or external devices (e.g., devices 202-203) via a wired connection (e.g., Controller Area Network (CAN bus), local interconnect network, etc.) or wireless protocol, such as 3G, 4G, 5G, Wi-Fi, Bluetooth, Dedicated Short Range Communications (DSRC), cellular vehicle-to-everything (C-V2X) PC5 or NR, and/or any other suitable wireless protocol. While communications circuitry 106 is shown as a single circuit, it should be understood by a person of ordinary skill in the art that communications circuitry 106 may be configured as a plurality of circuits. In one embodiment, circuitries 102-106 may be communicatively coupled to bus 112 for certain communication and data exchange purposes.

Vehicle 101 may further comprise a main processor 107 (also referred to herein as a "processing apparatus") that centrally processes and controls data communication throughout the system 100. The processor 107 may be configured as a single processor, multiple processors, or part of a processor system. In some illustrative embodiments, the processor 107 is equipped with advanced driver assistance circuitries and infotainment circuitries that allow for communication with and control of any of the circuitries in vehicle 100. Storage 108 may be configured to store data, software, media, files and the like, and may include map data, SPaT data and other associated data, discussed in greater detail below. Digital signal processor (DSP) 109 may comprise a processor separate from main processor 107, or may be integrated within processor 107. Generally speaking, DSP 109 may be configured to take signals, such as voice, audio, video, temperature, pressure, position, etc. that have been digitized and then process them as needed. Display 110 may consist of multiple physical displays (e.g., virtual cluster instruments, infotainment or climate control displays). Display 110 may be configured to provide visual (as well as audio) indicial from any circuitry in FIG. 1, and may be a configured as a human-machine interface (HMI), LCD, LED, OLED, or any other suitable display, and may be configured with touch-screen capability and/or include additional input-output components. The display 110 may also be configured with audio speakers for providing audio output. Input/output circuitry 111 is configured to provide inputs and outputs to/from other vehicle components of system 100, such as the vehicle components discussed below in FIGS. 5-6B including, but not limited to, heating/cooling, ventilation, seat adjustment and vibration, lighting, and other vehicle components known in the art, and are not expressly shown for the purposes of brevity. Similarly, input/output circuitry 111 may be configured to provide inputs and outputs to/from peripheral devices, such as cell phones, key fobs, device controllers, game controllers, and the like. As discussed above, circuitries 102-111 may be communicatively coupled to data bus 112 for transmitting/receiving data and information from other circuitries.

Figure 2:
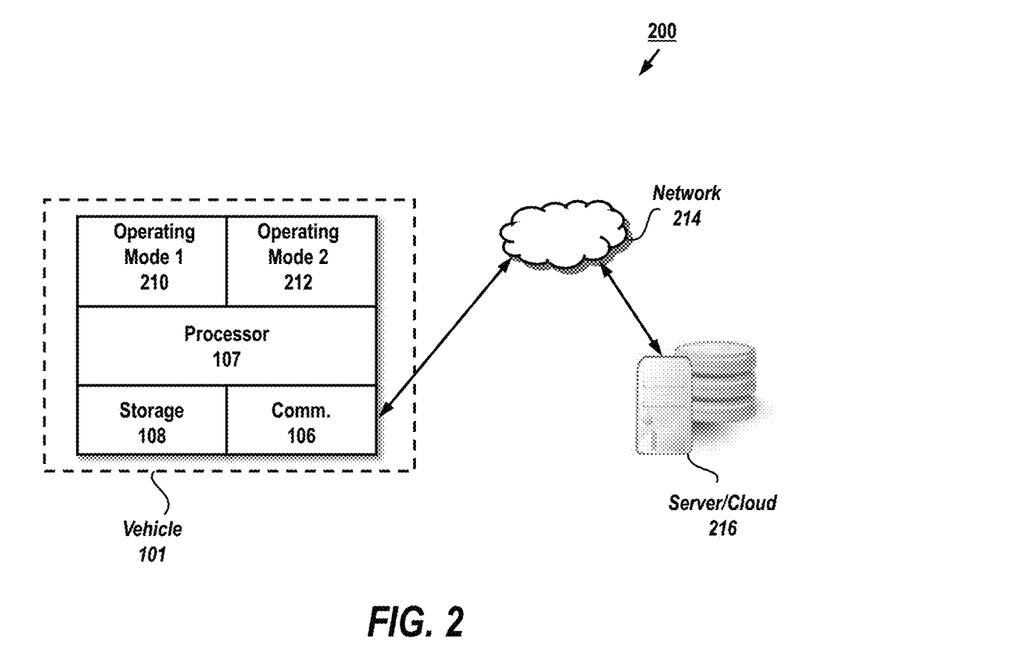
FIG. 2 shows an operating environment for a vehicle communicating with a server or cloud of a computer network according to some aspects of the present disclosure.

FIG. 2 shows an operating environment 200 for configuring a vehicle 101 to operate under a plurality of operating modes (210, 212) while communicating with a network 214 under some aspects of the present disclosure. In this example, a vehicle 101, such as the one discussed above in connection with FIG. 1, utilizes communications 107 to communicate with a network 214, operatively coupled to a server or cloud 216. In this example, the vehicle may be configured for a first operating mode 210 or a second operating mode 212, and may be configured according to an operational profile discussed below. The operating modes 210, 212 and associated profiles may be configured as data files and stored in storage 108 and executed by the processor 106, wherein the operating modes 210, 212 may be manually selected by a user (e.g., via display/HMI 110 and/or some other suitable component), or may be automatically selected by the processor 106.

When a first operating mode 210 is selected, the processor enables and/or disables vehicle components and may further reassign components to a different mode of operation. When a second operating mode is selected, the processor similarly enables and/or disables vehicle components and may further reassign components to a different mode of operation. In some examples, the first operating mode 210 may be a "normal" operating mode, wherein each vehicle component (e.g., steering wheel, ambient lights, air ventilators, etc.) operates under its normal functionality. Thus, turning the steering wheel would send an electrical signal to a sensor along the steering shaft, that may sense how much the steering wheel is rotated by the driver and/or sense how much force was used to turn the steering wheel (velocity sensitivity). The vehicle's computer (e.g., 107) may then processes this data for steering purposes. Similarly activating a switch (pushbutton, touchscreen, etc.) may activate and deactivate air ventilators or lights. In other words, a vehicle component actuation and/or operation results in the actuation and/or operation of the corresponding vehicle function.

Under a second operating mode 212, one or more vehicle components (e.g., steering wheel, ambient lights, air ventilators, etc.) may be modified such that activation and/or operation of the component results in an additional and/or alternate functionality being activated. It should be understood by those skilled in the art that operating modes that are different from "normal" operation should be limited to NDRT-type functions of a vehicle, and should be limited or prohibited from functioning in the driver area during active driving for safety reasons. Thus, activating or operating the vehicle under the second operating mode 212 may be allowed, for example, when the vehicle 101 is in "park".

Once the second operating mode 212 is activated, the processor 107 is configured to activate alternate and/or additional functions in vehicle components to generate a physical "immersive" effect, preferably in the cabin of the vehicle. In some examples, the processor 107 may be programmed such that, when the second operating mode 212 is activated, sensors (e.g., 104) detecting a turning of the steering wheel to the left or right causes a left or right driver-side air vent to activate. In some examples, the velocity of the steering wheel turn may be translated into a commensurate linear increase of air volume expelled from the air vent(s). Similarly, depression of a brake pedal or accelerator pedal (again—only when vehicle is safely parked), may cause a dome light or other suitable component to generate ambient light in the vehicle compartment. In some examples, the sensed pressure (e.g., via sensors 104) on a brake pedal or accelerometer pedal may be configured to linearly activate the brightness/intensity of the associated component, such that the brightness/intensity inside the vehicle cabin is increased in an associated linear manner. In other words, the processor 107 may be configured to increase brightness/intensity of the lighting commensurately with the increased pressure sensed from the pedal(s).

It should be understood by those skilled in the art that the non-limiting examples provided above are merely a few of the many configurations contemplated in the present disclosure, and that other vehicle components may be associated, activated and operated under various configurations. Further examples of vehicle components that may be configured to provide an immersive effect in the vehicle include, but are not limited tom ID lights, seat vibrators, seat ventilation, body shaker, electric body paint, and steering wheel force feedback, discussed below in connection with FIGS. 5-6B. In some examples, the configurations disclosed herein are preferably installed on processor-based vehicle component controllers that may be individually and/or collectively controlled via a central processor or processing apparatus (e.g., 107). In some examples, a plurality of processors or processing apparatuses may be utilized for controlling vehicle components. The programming and configuration of the processor(s) for activating and controlling vehicle component functions may be achieved using an embedded programming language such as C, C++, Python, and/or JAVA, and may be configured according to Motor Industry Software Reliability Association (MISRA) or AUTomotive Open System ARchitecture (AUTOSAR) standards for additional safety.

Thus, during operation, a vehicle will load a plurality of operating modes (210, 212), one of which is configured for normal operation. When the vehicle is in a safe operating condition (e.g., parked, parked, with charger attached), a user of the vehicle 101 may select (e.g., via 110) another operating mode (e.g., 212), in which the processor then reconfigures vehicle components to operate using alternative and/or additional activation and/or functions. In some examples, the vehicle may receive operating modes communicated over a network 214 from a server/cloud 216, where the operating modes are received as a file via communication circuitry 106 and stored in storage 108. Just as in the other examples disclosed herein, the processor 107 may then execute the received operating mode file received from the network 214 to reconfigures vehicle components. In some examples, the vehicle 101 may receive operating modes files as part of NDRT software applications that include, but are not limited to, games and media.

Figure 3:
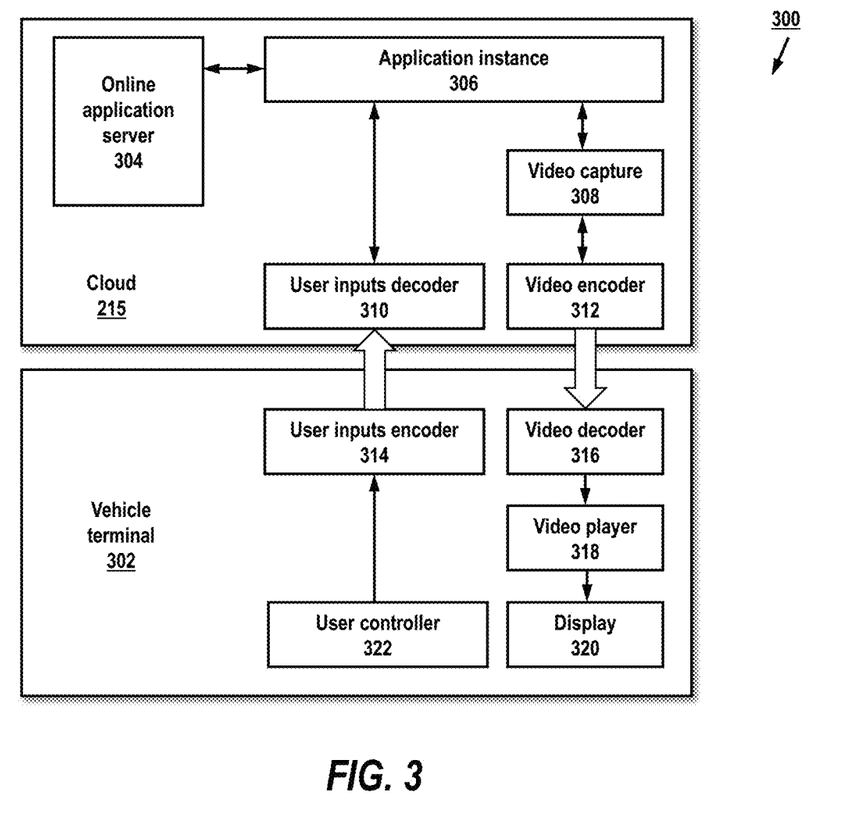
FIG. 3 shows an illustrative block diagram of a vehicle terminal communicating with a cloud to operate an application according to some aspects of the present disclosure.

FIG. 3 shows an illustrative block diagram 300 of a vehicle terminal 302 communicating with a server or cloud 215 to operate a NDRT software application according to some aspects of the present disclosure. In this example, the vehicle terminal 302 may include an independent controller, such as a game controller or cell phone, communicating with the vehicle via I/O circuitry 111, discussed above. In some examples, the vehicle terminal 302 may be configured as a collective plurality of vehicle components (e.g., accelerator, brake, steering wheel, display) grouped together to act as a terminal for a NDRT software application being executed. In some examples, the vehicle terminal 302 may be configured as include a game controller that operates in parallel with a plurality of vehicle components, where the vehicle terminal 302 may provide one or more activation signals for immersive effects or feedback.

The NDRT application in this example is illustrated as a game application. However, those skilled in the art will understand that the NDRT application may be configured as any other suitable application that may be provided via cloud service or other similar services. In this example, the NDRT application is configured as a video-based cloud gaming application, in which most or all processing is offloaded into the cloud 214, including the game engine, artificial intelligence (AI) processing, and rendering modules. User inputs and the encoded video frames are transmitted between the cloud game server and game players. The model in this example allows direct and on-demand streaming of game videos onto computers, consoles, and mobile devices, in a similar way to video on demand, through the use of a thin client. The actual game is stored in the online application server 304 and is streamed directly to vehicle terminals (302) accessing the server.

The exemplary architectural framework of FIG. 3 shows an example of video-based cloud games. In this example, the cloud 215 virtualizes an execution environment of an NDRT application from online application server 304 and initiates a game instance 306 once it receives a connection request from a vehicle terminal 302. Depicted as a data flow, the real-time gaming video is rendered by the game instance in the cloud and then recorded by the video capture module 308, frame by frame. Afterwards, the video frames are encoded in video encoder 312 and transmitted to the vehicle terminal 302 over the Internet. These encoded frames are reconstructed at the video decoder 316 in the game terminal and displayed by the video player 318 on a display 320. In reverse, as indicated by the control flow, the player's inputs are recorded by the user controller 322 and transmitted to the cloud server after encoded by the input encoder 314. The cloud server 215 receives these encoded signals and decodes them via user inputs decoder 310 to produce control inputs for the application/game instances, to reproduce the player's interactions in the cloud. It should be understood by those skilled in the art that other architectures for NDRT applications are contemplated in the present disclosure, and should not be limited to video-based cloud application architectures. Examples include, but not limited to, instruction-based application cloud architectures, file-based application cloud architectures, and/or component-based application cloud architectures.

Figure 4:
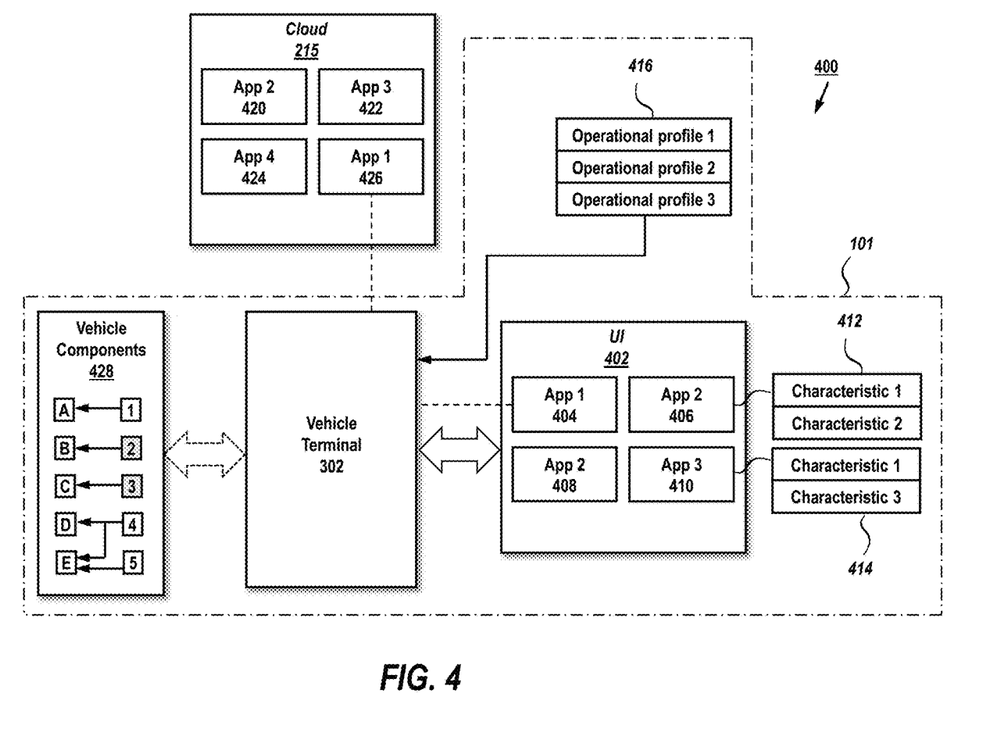
FIG. 4 shows an illustrative block diagram of a vehicle system utilizing a plurality of operational profiles for generating an immersive effect for any of a plurality of applications using vehicle components according to some aspects of the present disclosure.

FIG. 4 shows an illustrative block diagram 400 of a vehicle system utilizing a plurality of operational profiles 416 for generating an immersive effect in the vehicle for any of a plurality of applications 420-426 using vehicle components 428 according to some aspects of the present disclosure. In this example, a portion of vehicle 101 is depicted, wherein vehicle 101 communicates (e.g., via communications 106) with cloud 215, which stores in a memory a plurality of executable applications 420, 422, 424, 426. In this example, the applications 420-426 may be configured as NDRT applications or other suitable applications. The vehicle 101 may further be configured with a user interface (UI) 402, which allows a user to interface with the vehicle terminal 302 and select, configure and/or execute applications 404, 406, 408 and 410. In in some examples, the applications 404-410 in vehicle 101 may be downloaded from cloud 215, and associated with respective applications 420-426, where each application 404-410 is operated on the vehicle 101 as a cloud service. In some examples, aspects of applications 404-410 may be executed on vehicle 101 under an instruction-based architecture (e.g., vehicle terminal 302 interprets application instructions with a designated instruction set and renders aspects of the application locally at the terminal), a file-based architecture (e.g., vehicle terminal 302 uses "progressive downloading" to locally execute application instances), and/or a component-based architecture (e.g., vehicle terminal 302 dynamically executes modularized, concatenated components of an application migrated to/from cloud 215), or other suitable mechanism.

In this example, some or all of the applications 404-410 may be configured with characteristic data 412, 414 that includes data describing one or more characteristics ("characteristics 1-3") of each application. As can be seen in the figure, "application 2" 406 is configured with two characteristics 412 ("characteristic 1" and "characteristic 2") and "application 3" 410 is also configured with two characteristics ("characteristic 1" and "characteristic 3"), where one characteristic is the same ("characteristic 1") and one characteristic is different ("characteristic 3"). It should be understood by those skilled in the art that the example of FIG. 4 is non-limiting, and that fewer or greater characteristics may be configured/assigned to each application. Examples of characteristic data for characteristics 412, 414 include, but are not limited to, a name of the application, an application type (e.g., game, media, communications), an application category (e.g., driving, action, social media), a user association (e.g., "application 2" is associated with "driver 1", "application 3" is associated with "driver 2"), and so forth.

During operation, when a user selects "application 1" 404 via UI 402, the vehicle terminal 302 may communicate with the associated "application 1" 426 stored on cloud 215, wherein execution of the application begins. At any time prior, during, or after execution, the vehicle may load one of the operational profiles 416, which in turn activates an operational mode (210, 212). The loading of the operational profile 416 may be done manually by a user (e.g., selecting an operational profile via UI 402), or may be done automatically via the vehicle terminal 302. For automatic loading, the vehicle terminal 302 may utilize characteristic data 412, 414, where individual characteristics, or combinations of characteristics for applications (404-410), are associated with an operational profile 416. Thus, for example, if a user selects "application 1" 404 for execution, the vehicle terminal 302 may utilize the characteristic data (not explicitly shown for application 404) to identify and load the operational profile 416 associated with the characteristic data.

Once the operational profile is loaded, the vehicle terminal 302 then uses the operational profile to associate assigned vehicle components (e.g., steering wheel, accelerator, brake, touchscreen button(s), steering wheel buttons, etc.) with respective immersive vehicle functions (e.g., activate one or more air ventilators, activate ambient light, set vibration, etc.). As used herein, an "immersive vehicle function" may be defined as a function, when activated by a vehicle component, that provides a physical effect (e.g., air, light, sound, vibration, etc.) in the area of the user of a vehicle. In the example of FIG. 4, the individual vehicle components of 428 are designated as activating components 1-5 (i.e., the component used to send activating signal for an immersive vehicle function), while the individual immersive vehicle components (i.e., the component used to generate an immersive effect once activated) are designated as A-E. Here, when "application 1" 404 is activated, an associated operational profile 416 is loaded, in which vehicle component 2 and vehicle component 3 are configured and activated (shown in shaded box) for use.

Accordingly, each time vehicle component 2 is triggered or used, immersive vehicle component B is activated to generate an immersive effect. Similarly, when vehicle component 3 is triggered or used, immersive vehicle component C is activated to generate another, different, immersive effect. It can be seen from the example that a vehicle component may be configured to activate a respective immersive vehicle component. However, in some examples, a vehicle component may be configured to activate a plurality of immersive vehicle components. For example, vehicle component 4 is shown in the figure as being configured to active both immersive vehicle components D and E. Of course, one skilled in the art can recognize that additional immersive vehicle components (e.g., three or more) can be configured for a respective vehicle component, depending on the design needs of the immersive system.

Figure 5:
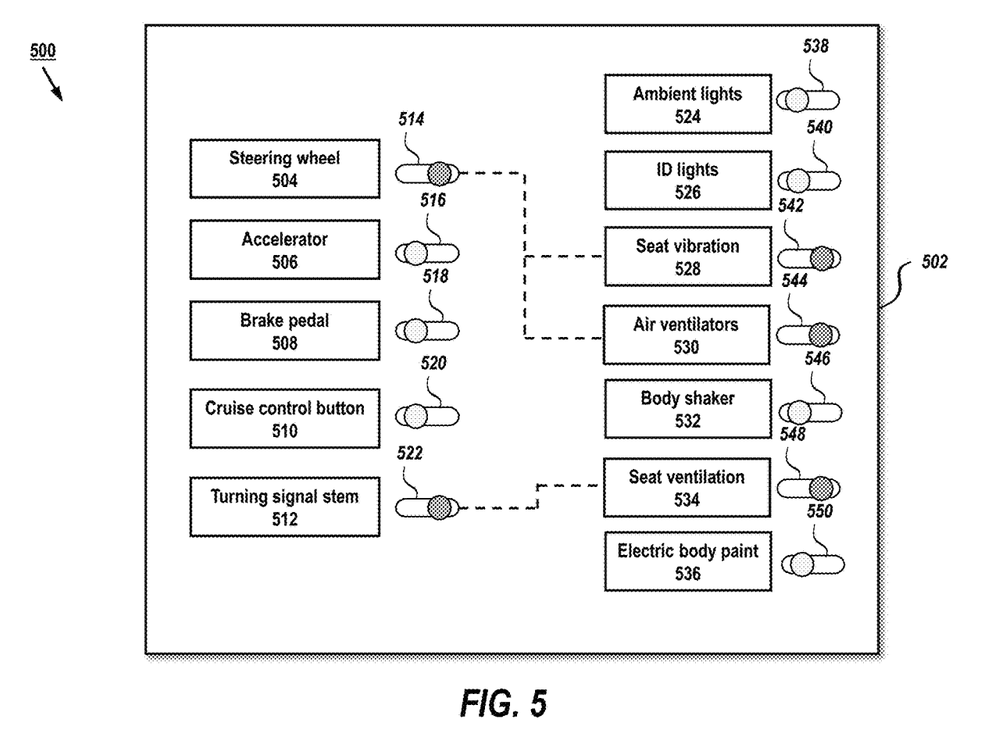
FIG. 5 shows an illustrative user interface for activating immersive functions of a vehicle according to some aspects of the present disclosure.
Figure 6A:
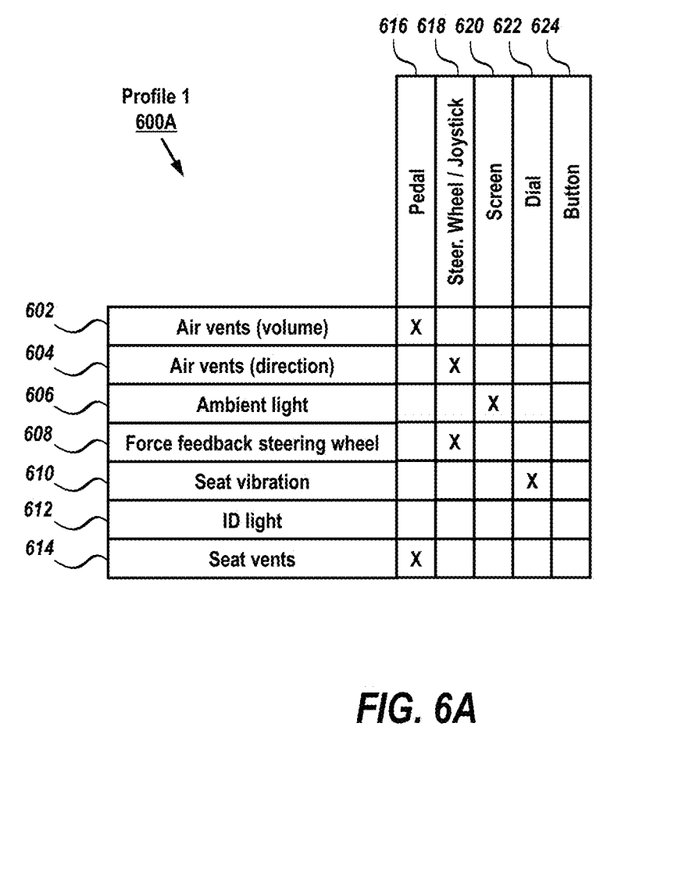
FIG. 6A shows an illustrative configuration for an operational profile according to some aspects of the present disclosure.

FIG. 5 shows an illustrative user interface 500 for activating immersive functions of a vehicle according to some aspects of the present disclosure. The interface 502 may be part of a vehicle display or other suitable component that allows a user to manually configure operating modes (210, 212), discussed above. In this example, a control panel 502 may be provided, for example, as part of a UI (e.g., 402) to allow a user to manually reconfigure a vehicle component (e.g., 504-512) to control a vehicle immersion component (524-536) to provide one or more vehicle immersive component effects. Generally speaking, an "immersive effect" as used herein may be defined as any physical effect (e.g., visual, audible, tactile, etc.) caused by a component inside and/or in the vicinity of the vehicle interior.

In the simplified example of FIG. 5, a plurality of vehicle components, including, but not limited to, steering wheel 504, accelerator 506, brake pedal 508, cruise control button 510, and turning signal stem 512, are each provided with a respective toggle control 514-522, which allows a user to activate or deactivate the individual vehicle component for use in immersive functions. Here, the toggle control 514 for steering wheel 502 is toggled "on", and the toggle control 522 for turning signal stem 512 is also toggled "on", meaning each respective vehicle component is activated for immersive functions. Toggle controls 516-520, which correspond to vehicle components 506-510 are toggled to "off" in this example, which means vehicle components 506-510 will remain inactive during execution of the associated operational profile.

Once the toggle control 514 is toggled "on", the control panel 502 may be configured to present one or more vehicle immersion components for selection by the user. In this example, the vehicle immersion components include, but are not limited to, ambient lights 524, ID lights 526, seat vibration 528, air ventilators 530, body shaker 532, seat ventilation 534 and electric body paint 536, each operable via one or more controllers or control circuits of the vehicle. The user may then select one or more vehicle immersion control components to be activated when the steering wheel 504 is used. Here, the user selects toggle control 542 to "on", for seat vibration 528 and also selects toggle control 544 to "on" for air ventilators 530. Accordingly, use of the steering wheel 504 under the executed operational profile will result in the seat vibration 528 and air ventilators 530 both being activated when the steering wheel 504 is turned. Similarly, the user may select toggle control 548 to "on", for seat ventilation 534. Accordingly, physical use of the steering wheel 504 under the executed operational profile will result in the seat vibration 528 and air ventilators 530 both being activated when the steering wheel 504 is turned during use. Similarly, physical activation of the turning signal stem 512 under the same executed operational profile will result seat ventilation 534 being activated.

As can be seen from the simplified example, vehicle components may be reconfigured manually or automatically to function as vehicle immersion components under a given operational profile, and may be particularly advantageous for use with NDRT applications. By utilizing a vehicle processing apparatus such as a vehicle CPU, vehicle components that are initially configured to perform a respective vehicle function (e.g., turning signal stem activating turning signal light), can be reconfigured using an operational profile to perform alternative and/or additional vehicle functions (e.g., activating seat ventilation) to provide an immersive effect in the vehicle. Furthermore, while not explicitly disclosed in the figure, vehicle immersion components may be further configured to provide a range of intensities for immersive effects. For example, an additional toggle selector may be provided for seat vibration 528 allowing a user to adjust the seat vibration intensity between "low", "medium" and "high". Alternately, a dial or slide may be provided to allow a user to select a range for the intensity (e.g., 1-10, 1-100, etc.) for the seat vibration. Similarly, one or more selectors may be provided for the air ventilators to 530 to specify intensities, as well as associate left/right ventilators with left/right movements of the steering wheel 504.

Moreover, vehicle components may be configured with secondary control data to modify vehicle immersion component operational intensities according to a configured scale (e.g., linear, logarithmic, exponential, etc.). Using existing vehicle sensors (e.g., 104) or suitable specially-purposed sensor(s) known in the art, the detected force applied to a vehicle component may be used to commensurately alter an immersive effect of a vehicle immersion component in a scaled manner. In some examples, the increased turning force used on a steering wheel (504) may be used to commensurately increase the air vent volume (blowing air intensity) as the steering wheel is being turned with greater force. Similarly, the increase of pressure on a touch screen may be used to increase the illumination intensity of vehicle cabin lighting (ambient light). In some examples, thresholds may be configured for the vehicle component sensor readings to apply a series of different immersive effects throughout a single range of use. For example, a steering wheel (504) may be configured to activate an air ventilator during initial turning, and then activate a cabin light (e.g., ambient light 524) when it is detected by sensors that a steering wheel is approaching, or at, a maximum turn radius. It should be understood by those skilled in the art that multitudes of other configurations and combinations for setting operational conditions and ranges for vehicle components are contemplated in the present disclosure.

FIG. 6A shows an illustrative configuration for an operational profile 600A according to some aspects of the present disclosure. In this example, the operational profile 600 represents portions of operational profile data that is configured manually (e.g., as in the example of FIG. 3) or automatically (e.g., via characteristic data 412, 414, or, via presets), and is shown in a grid form for the sake of simplicity. Here, a plurality of vehicle components are shown, including a vehicle pedal 616, a steering wheel or joystick 618, a vehicle display screen 620, a vehicle dial 622 and a vehicle button 624. Additionally, a plurality of vehicle immersion components are shown, including air vent air volume control circuit 602, air vent direction control circuit 603, ambient light control circuit 606, force feedback steering wheel control circuit 608, seat vibration control circuit 610, ID light control circuit 612, and seat vent control circuit 614.

As can be seen in the figure, an operational profile includes algorithmic code for execution on the vehicle, wherein a vehicle component (616-624) is configured to activate one or more associated vehicle immersion components (602-614). In this example, each association of a vehicle component with a vehicle immersion component in the operational profile is shown by an "X". Accordingly, the pedal 616 is configured to activate air volume control circuit 602 and seat vent control circuit 614 simultaneously, in this example. Similarly, steering wheel/joystick 618 is configured to activate air vent direction control circuit 604 and force feedback steering wheel control circuit 608 simultaneously. Screen 620 (which may be a button on the screen, or the screen itself) is configured to activate ambient light control circuit 606, and vehicle dial 622 (which may be a dial in the vehicle dashboard or console) activates seat vibration control circuit 610. The button 624, in this example, which may be any button on the vehicle dash, steering wheel, arm rest or console, is unassigned, and the activation of the button 624 will not have any effect during operation of the operational profile.

Figure 6B:
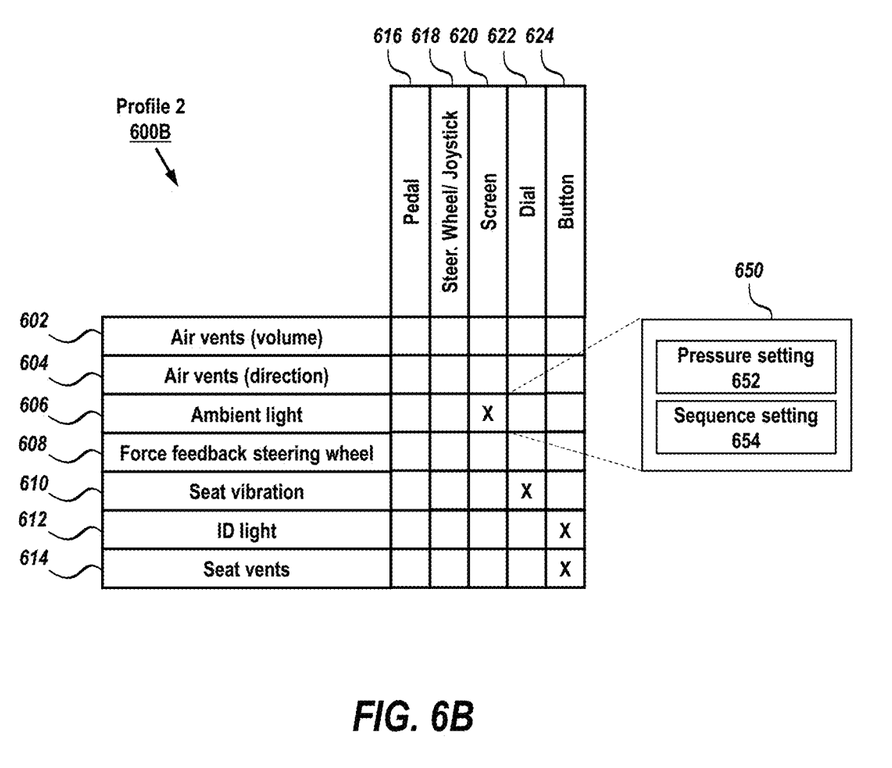
FIG. 6B shows another illustrative configuration for an operational profile according to some aspects of the present disclosure.

FIG. 6B shows another illustrative configuration for an operational profile 600B according to some aspects of the present disclosure. The operational profile 600B is configured similarly to the operational profile 600A discussed above in connection with FIG. 6A, and includes a plurality of vehicle components, including a vehicle pedal 616, a steering wheel or joystick 618, a vehicle display screen 620, a vehicle dial 622 and a vehicle button 624. Additionally, a plurality of vehicle immersion components are shown, including air vent air volume control circuit 602, air vent direction control circuit 603, ambient light control circuit 606, force feedback steering wheel control circuit 608, seat vibration control circuit 610, ID light control circuit 612, and seat vent control circuit 614. Here, the pedal 616 and steering wheel/joystick 618 are not assigned to any vehicle immersion component, and their operation will not have any effect during operation of the operational profile 600B. Screen 620 is configured to activate ambient light control circuit 606, while dial 622 is configured to activate the seat vibration control circuit 610 and button 624 is configured to activate the ID light 612 and seat vents 614 simultaneously.

As can be seen in the figure, the configuration of screen 620 to activate ambient light control circuit 606 further includes secondary control data 650, as discussed above in connection with FIG. 5. Here, the secondary control data 650 includes a pressure setting 652 and sequence setting 654. The pressure setting may include one ore more parameters specifying operational intensities for the ambient light control circuit 606. For example, the pressure setting 652 may define a scaled operation of an ambient light in the vehicle (via 606), based on the amount of pressure detected when the screen is being touched by a user. Accordingly, a light may be configured to illuminate more brightly on a linear, logarithmic or exponential scale as the amount of pressure increases. Sequence setting 654 may be configured to detect a sequence of presses for a user's finger onto the vehicle screen 620, which in turn causes a specific lighting sequence or lighting effect (e.g., strobe, slow dim) via ambient light control circuit 606. In some examples, the sequence setting 654 may also include other touching, such as swipes, across the vehicle screen 620 in order to configure a specific lighting sequence or lighting effect.

Figure 7:
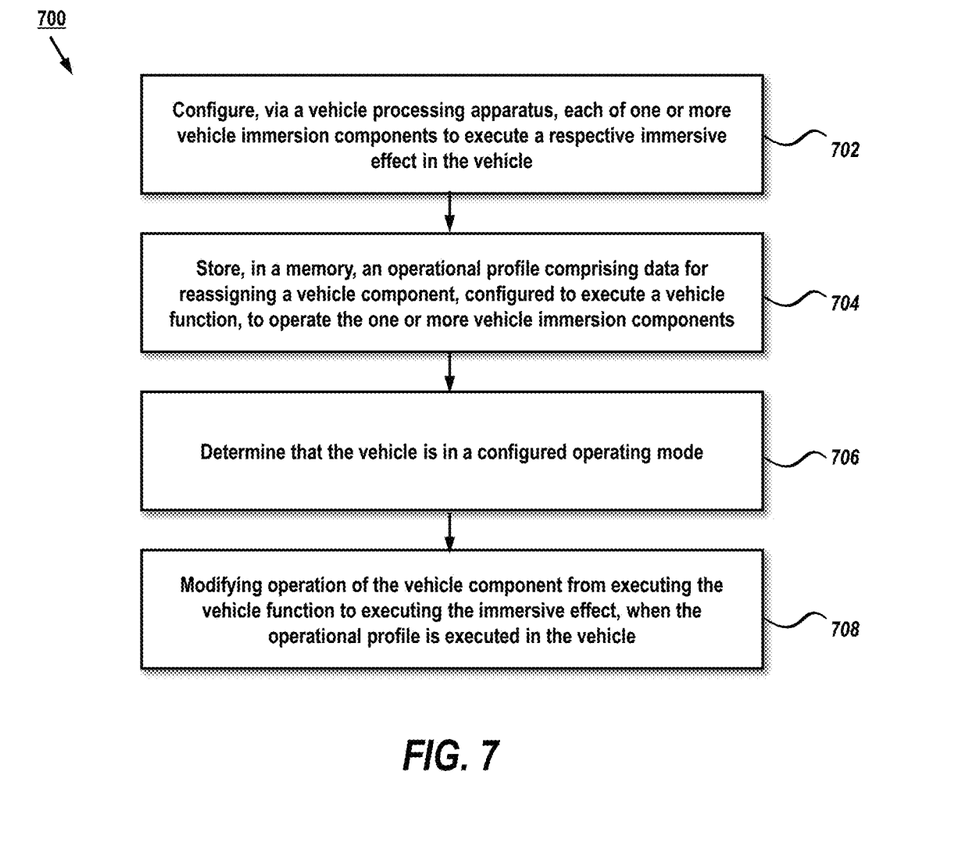
FIG. 7 shows a method for operating a vehicle system according to some aspects of the present disclosure.

FIG. 7 shows a method 700 for operating a vehicle system according to some aspects of the present disclosure. In block 702, a vehicle processing apparatus (e.g., 107, 302) may configure each of one or more vehicle immersion components (e.g., 524-536, 602-614) to execute a respective immersive effect in the vehicle. In block 704, an operational profile (e.g., 416) may be generated and/or stored in memory (e.g., 108), wherein the operational profile comprises data for reassigning a vehicle component (e.g., 504-512, 616-624), configured to execute a vehicle function (e.g., steering, braking, accelerating, etc.), to operate the one or more vehicle immersion components (e.g., 524-536, 602-614). In block 706, the vehicle may determine that the vehicle is in a configured operating mode (e.g., parked, charging, etc.), and then modify operation of the vehicle component from executing the vehicle function to executing the immersive effect, when the operational profile is executed in the vehicle. In other words, once it is determined that the vehicle is in a safe operating mode, vehicle components, such as a steering wheel may be modified from executing a vehicle function (steering) to executing a vehicle immersion component, such as an air vent control circuit, for generating an immersive effect.

In some examples, the data for the operational profile comprises operational data for activating one or more vehicle immersion components when the vehicle component is operated. in some examples, the operational data comprises scaling data for configuring a range of intensities for an immersive effect when the vehicle component is operated, wherein the scaling data comprises data for setting the range of intensities for the immersive effect according to one of a linear scale, a logarithmic scale, and an exponential scale. In some examples, the immersive effect comprises one or more of a vibration effect, a light effect, a sound effect, an air-blowing effect inside the vehicle. In some examples, one or more of the vehicle immersion components comprise one or more of a vehicle lighting control circuit, a dash lighting control circuit, a seat vibration control circuit, an air ventilator control circuit, a body shaker control circuit, and/or a seat ventilation control circuit, and the vehicle component comprises one of a vehicle steering wheel, a vehicle accelerator, a vehicle brake pedal, a turning signal stem, a vehicle display touch screen, a vehicle button, a vehicle joystick, a vehicle slide, and a vehicle dial.

As described above, some or all illustrated features may be omitted in a particular implementation within the scope of the present disclosure, and some illustrated features may not be required for implementation of all examples. In some examples, the methods and processes described in FIG. 7 may be performed by a vehicle (e.g., 101), as described above and/or by a processor/processing system or circuitry or by any suitable means for carrying out the described functions.

The following provides an overview of aspects of the present disclosure:

Aspect 1 is a vehicle system, comprising: a vehicle processing apparatus; a memory, operatively coupled to the vehicle processing apparatus; one or more vehicle immersion components, operatively coupled to the vehicle processing apparatus, each of the one or more vehicle immersion components configured to execute an immersive effect in the vehicle; and a vehicle component, operatively coupled to the vehicle processing apparatus, wherein the vehicle component is configured to execute a vehicle function, wherein the memory is configured to store an operational profile comprising data for assigning the vehicle component to the one or more vehicle immersion components, and wherein the vehicle component is configured to modify operation from executing the vehicle function to executing the immersive effect when the operational profile is executed.

Aspect 2 may be combined with aspect 1 and includes that the vehicle processing apparatus is configured to determine that the vehicle is in a configured operating mode prior to executing the operational profile.

Aspect 3 may be combined with any of aspects 1 and/or 2, and includes that the data for the operational profile comprises operational data for activating one or more vehicle immersion components when the vehicle component is operated.

Aspect 4 may be combined with any of aspects 1 through 3, and includes that the operational data comprises scaling data for configuring a range of intensities for an immersive effect when the vehicle component is operated.

Aspect 5 may be combined with any of aspects 1 through 4, and includes that the scaling data comprises data for setting the range of intensities for the immersive effect according to one of a linear scale, a logarithmic scale, and an exponential scale.

Aspect 6 may be combined with any of aspects 1 through 5, and includes that the immersive effect comprises one or more of a vibration effect, a light effect, a sound effect, an air-blowing effect inside the vehicle.

Aspect 7 may be combined with any of aspects 1 through 6, and includes that the one or more vehicle immersion components comprise one or more of a vehicle lighting control circuit, a dash lighting control circuit, a seat vibration control circuit, an air ventilator control circuit, a body shaker control circuit, and/or a seat ventilation control circuit, and that the vehicle component comprises one of a vehicle steering wheel, a vehicle accelerator, a vehicle brake pedal, a turning signal stem, a vehicle touch screen, a vehicle button, a vehicle joystick, a vehicle slide, and a vehicle dial.

Aspect 8 is a method for operating a vehicle immersion system, comprising: configuring, via a vehicle processing apparatus, each of one or more vehicle immersion components to execute a respective immersive effect in the vehicle; storing, in a memory, an operational profile comprising data for reassigning a vehicle component, configured to execute a vehicle function, to operate the one or more vehicle immersion components; and modifying operation of the vehicle component from executing the vehicle function to executing the immersive effect, when the operational profile is executed in the vehicle.

Aspect 9 may be combined with aspect 8 and further includes determining that the vehicle is in a configured operating mode prior to executing the operational profile.

Aspect 10 may be combined with any of aspects 8 and/or 9, and includes that the data for the operational profile comprises operational data for activating one or more vehicle immersion components when the vehicle component is operated.

Aspect 11 may be combined with any of aspects 8 through 10, and includes that the operational data comprises scaling data for configuring a range of intensities for an immersive effect when the vehicle component is operated.

Aspect 12 may be combined with any of aspects 8 through 11, and includes that the scaling data comprises data for setting the range of intensities for the immersive effect according to one of a linear scale, a logarithmic scale, and an exponential scale.

Aspect 13 may be combined with any of aspects 8 through 12, and includes that the immersive effect comprises one or more of a vibration effect, a light effect, a sound effect, an air-blowing effect inside the vehicle.

Aspect 14 may be combined with any of aspects 8 through 13, and includes that the one or more vehicle immersion components comprise one or more of a vehicle lighting control circuit, a dash lighting control circuit, a seat vibration control circuit, an air ventilator control circuit, a body shaker control circuit, and/or a seat ventilation control circuit, and that the vehicle component comprises one of a vehicle steering wheel, a vehicle accelerator, a vehicle brake pedal, a turning signal stem, a vehicle touch screen, a vehicle button, a vehicle joystick, a vehicle slide, and a vehicle dial.

Aspect 15 is a method for operating an immersion system for a vehicle, comprising: configuring, via a vehicle processing apparatus, each of one or more vehicle immersion components to execute a respective immersive effect in the vehicle; generating an operational profile for the vehicle, wherein the operational profile comprises user-selected data assigning a vehicle component, configured to execute a vehicle function, to operate the one or more vehicle immersion components; and modifying operation of the vehicle component from executing the vehicle function to executing the immersive effect, when the operational profile is executed in the vehicle.

Aspect 16 may be combined with aspect 15 and further includes determining that the vehicle is in a configured operating mode prior to executing the operational profile.

Aspect 17 may be combined with any of aspects 15 and/or 16, and includes that the data for the operational profile comprises operational data for activating one or more vehicle immersion components when the vehicle component is operated.

Aspect 18 may be combined with any of aspects 15 through 17, and includes that the operational data comprises scaling data for configuring a range of intensities for an immersive effect when the vehicle component is operated.

Aspect 19 may be combined with any of aspects 15 through 18, and includes that the scaling data comprises data for setting the range of intensities for the immersive effect according to one of a linear scale, a logarithmic scale, and an exponential scale.

Aspect 20 may be combined with any of aspects 15 through 19, and includes that the immersive effect comprises one or more of a vibration effect, a light effect, a sound effect, an air-blowing effect inside the vehicle.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A vehicle system, comprising:
   a vehicle processing apparatus;
   a memory, operatively coupled to the vehicle processing apparatus;
   one or more vehicle immersion components, operatively coupled to the vehicle processing apparatus, each of the one or more vehicle immersion components configured to execute an immersive effect in the vehicle for a non-driving media entertainment task, wherein the immersive effect comprises a physical effect generated inside or in the vicinity of the vehicle; and
   a vehicle component, operatively coupled to the vehicle processing apparatus, wherein the vehicle component is configured to execute a vehicle function,
   wherein the memory is configured to store an operational profile comprising user-selected data configured via a user interface for dynamically assigning operation of the vehicle component to activate the one or more vehicle immersion components in a first configuration or reassigning operation of the vehicle component to activate the one or more vehicle immersion components in a second configuration different from the first configuration, and
   wherein the vehicle component is configured to dynamically assign or reassign operation of the vehicle component from executing the vehicle function to activating one or more vehicle immersion components for the non-driving media entertainment task based on the operational profile.

2. The vehicle system of claim 1, wherein the vehicle processing apparatus is configured to determine that the vehicle is in a configured operating mode prior to executing the operational profile.

3. The vehicle system of claim 1, wherein the data for the operational profile comprises operational data for activating one or more vehicle immersion components when the vehicle component is operated.

4. The vehicle system of claim 3, wherein the operational data comprises scaling data for configuring a range of intensities for an immersive effect when the vehicle component is operated.

5. The vehicle system of claim 4, wherein the scaling data comprises data for setting the range of intensities for the immersive effect according to one of a linear scale, a logarithmic scale, and an exponential scale.

6. The vehicle system of claim 1, wherein the immersive effect comprises one or more of a vibration effect, a light effect, a sound effect, an air-blowing effect inside the vehicle.

7. The vehicle system of claim 1,
   wherein the one or more vehicle immersion components comprise one or more of a vehicle lighting control circuit, a dash lighting control circuit, a seat vibration control circuit, an air ventilator control circuit, a body shaker control circuit, and/or a seat ventilation control circuit,
   and the vehicle component comprises one of a vehicle steering wheel, a vehicle accelerator, a vehicle brake pedal, a turning signal stem, a vehicle touch screen, a vehicle button, a vehicle joystick, a vehicle slide, and a vehicle dial.

8. A method for operating a vehicle immersion system, comprising:
   configuring, via a vehicle processing apparatus, each of one or more vehicle immersion components to execute a respective immersive effect in the vehicle for a non-driving media entertainment task, wherein the immersive effect comprises a physical effect generated inside or in the vicinity of the vehicle;
   storing, in a memory, an operational profile comprising user-selected data configured via a user interface for dynamically assigning operation of a vehicle component to activate the one or more vehicle immersion components in a first configuration or reassigning operation of the vehicle component to activate the one or more vehicle immersion components in a second configuration different from the first configuration; and
   dynamically assigning or reassigning, via the vehicle processing apparatus, operation of a vehicle component from executing a vehicle function to activating the one or more vehicle immersion components for the non-driving media entertainment task based on the operational profile.

9. The method of claim 8, further comprising determining that the vehicle is in a configured operating mode prior to executing the operational profile.

10. The method of claim 8, wherein the data for the operational profile comprises operational data for activating one or more vehicle immersion components when the vehicle component is operated.

11. The method of claim 10, wherein the operational data comprises scaling data for configuring a range of intensities for an immersive effect when the vehicle component is operated.

12. The method of claim 11, wherein the scaling data comprises data for setting the range of intensities for the immersive effect according to one of a linear scale, a logarithmic scale, and an exponential scale.

13. The method of claim 8, wherein the immersive effect comprises one or more of a vibration effect, a light effect, a sound effect, an air-blowing effect inside the vehicle.

14. The method of claim 8,
wherein the one or more vehicle immersion components comprise one or more of a vehicle lighting control circuit, a dash lighting control circuit, a seat vibration control circuit, an air ventilator control circuit, a body shaker control circuit, and/or a seat ventilation control circuit,
and the vehicle component comprises one of a vehicle steering wheel, a vehicle accelerator, a vehicle brake pedal, a turning signal stem, a vehicle touch screen, a vehicle button, a vehicle joystick, a vehicle slide, and a vehicle dial.

15. A method for operating an immersion system for a vehicle, comprising:
configuring, via a vehicle processing apparatus, each of one or more vehicle immersion components to execute a respective immersive effect in the vehicle for a non-driving media entertainment task, wherein the immersive effect comprises a physical effect generated inside or in the vicinity of the vehicle;
generating, via the vehicle processing apparatus, an operational profile for the vehicle, wherein the operational profile comprises user-selected data configured via a user interface for dynamically assigning operation of a vehicle component to activate the one or more vehicle immersion components in a first configuration or reassigning operation of the vehicle component to activate the one or more vehicle immersion components in a second configuration different from the first configuration; and
dynamically assigning or reassigning, via the vehicle processing apparatus, operation of a vehicle component from executing a vehicle function to activating the one or more vehicle immersion components for the non-driving media entertainment task based on the operational profile.

16. The method of claim 15, further comprising determining that the vehicle is in a configured operating mode prior to executing the operational profile.

17. The method of claim 16, wherein the data for the operational profile comprises operational data for activating one or more vehicle immersion components when the vehicle component is operated.

18. The method of claim 17, wherein the operational data comprises scaling data for configuring a range of intensities for an immersive effect when the vehicle component is operated.

19. The method of claim 18, wherein the scaling data comprises data for setting the range of intensities for the immersive effect according to one of a linear scale, a logarithmic scale, and an exponential scale.

20. The method of claim 15, wherein the immersive effect comprises one or more of a vibration effect, a light effect, a sound effect, an air-blowing effect inside the vehicle.

* * * * *